Nov. 23, 1954 J. R. ANDERSON 2,695,398

FERROELECTRIC STORAGE CIRCUITS

Filed June 16, 1953 2 Sheets-Sheet 1

INVENTOR
J. R. ANDERSON
BY
ATTORNEY

INVENTOR
J. R. ANDERSON
BY
[signature]
ATTORNEY

United States Patent Office 2,695,398

Patented Nov. 23, 1954

2,695,398

FERROELECTRIC STORAGE CIRCUITS

John R. Anderson, Berkeley Heights, N. J., assignor to Bell Telephone Laboratories, Incorporated, New York, N. Y., a corporation of New York Application June 16, 1953, Serial No. 361,942

13 Claims. (Cl. 340—173)

This invention relates to electrical circuits for the storage of information and more particularly to such circuits utilizing ferroelectric elements.

The employment of condensers having dielectrics of a ferroelectric material, such as barium titanate, for the storage of information is disclosed in application Serial No. 254,245, filed November 1, 1951 of J. R. Anderson. In such materials a relationship exists between an electric field applied to the material and the polarization which is of the general form of the hysteresis loop exhibited by ferromagnetic materials. Generally, as described in the above application, the ferroelectric material is polarized in one direction initially; information is then stored by applying voltages to the electrodes of the condenser to reverse this polarization. The stored information is then read out by applying voltages to the electrodes to restore the initial polarization. The magnitude of the output pulse will depend on the polarity of polarization of the ferroelectric material, and thus on whether information has been stored, because of the different capacitance values of the condenser as different portions of the hysteresis loop of the ferroelectric material are traversed.

A number of these ferroelectric condensers may be arranged in rows in a storage matrix with their electrodes connected together and information stored or read out in a number of them at the same time. As disclosed in application Serial No. 261,665, filed December 14, 1951 of J. R. Anderson a particular condenser is chosen for the storage of information by having a voltage of one polarity applied to the electrode on one side of that condenser and a voltage of opposite polarity applied to the electrode on the other side of the condenser, the two voltages being individually insufficient to reverse the polarization of the ferroelectric material between these particular electrodes but when occurring together being of the proper polarity and sufficient voltage to cause reversal of the polarization of the material of the condenser and thus storage of information. A third voltage may then be applied across the condenser of sufficient voltage and proper polarity to cause a return to the initial state of polarization of the ferroelectric material, thus reading out any information stored in the condenser.

Advantageously a single pulse may be applied to one of the electrodes both to read out stored information and to apply the partial storage voltage to that electrode, by applying the pulse through a differentiation circuit, as more fully disclosed in application Serial No. 361,941 filed June 16, 1953 of J. R. Anderson, the single pulse being of a voltage at least sufficient to read out information stored in the condenser. The differentiation circuit may comprise a capacitor and a resistor so that the voltage output from the differentiation circuit to the electrode of the ferroelectric condenser decays during the presence of the pulse due to charging of the condenser. On cessation of the pulse, the voltage output from the differentiation circuit will immediately drop to a voltage of reverse polarity. If a partial storage voltage is applied to the other electrode of the condenser when the voltage from the differentiation circuit reverses polarity on cessation of the pulse, the partial storage voltage and the voltage remaining on the capacitor of the differentiation circuit can provide storage of information in the condenser.

When a number of condensers have electrodes connected together, as when the condensers are formed by plating electrodes on a single slab of ferroelectric material, the electrodes on the one face running in a direction perpendicular to the electrodes on the face of the slab, a disturbing voltage is applied to each condenser to which a single partial storage voltage is applied. This disturbing voltage may be sufficient to reverse the polarization of some of the domains of the ferroelectric material of those condensers, but is insufficient to reverse a sufficient number of domains to change the polarization of the material and thus cause storage of information. However, if a number of disturbing voltages are applied to the same condenser in succession, without a reading out voltage having been applied to that condenser, the cumulative effect may be sufficient to reverse a sufficient number of domains so that the polarization of the material is reversed and an information signal stored in the condenser. Such a signal is of course an error as it is due to the disturbing voltages applied to only one electrode of the condenser and not to true storage voltages.

It is a general object of this invention to provide improved electrical information storage circuits utilizing ferroelectric elements.

More specifically it is an object of this invention to prevent the storage of erroneous information due to repeated applications of disturbing voltages to ferroelectric condensers.

It is a further object of this invention to reduce the possible repetitive disturbing voltage introduced to a negligible voltage.

It is a still further object of this invention to decrease the time interval required for storing and reading out information in ferroelectric condensers.

In one specific illustrative embodiment of this invention, a two-dimensional storage matrix comprises a single slab of ferroelectric material having a number of common electrodes extending in parallel on one face of the slab in one direction and a number of common electrodes extending in parallel on the other face of the slab in a direction perpendicular to the first direction, as disclosed in the above-mentioned application Serial No. 261,665. A differentiation circuit is connected to each of the first group of electrodes, hereinafter referred to as row electrodes, as disclosed in the above mentioned application Serial No. 361,941. A pulse is applied to the differentiation circuit of a polarity and a voltage magnitude in excess of that required to reverse the polarization of the ferroelectric material. The positive portion of the differentiated pulse will reverse the polarization of condensers in which a "1" has been stored, causing a positive pulse to appear on the respective output leads, which comprise the second group of electrodes on the other face of the slab of ferroelectric material, hereinafter referred to as column leads and column electrodes.

In this specific embodiment of this invention, the negative portion of the differentiated read out pulse is itself of sufficient voltage magnitude to reverse the polarization of the ferroelectric material, and thus store a "1," if substantially the total voltage appears across the condenser. In accordance with a feature of this invention, a detection circuit is connected to each of the column leads. When information is to be stored, an information signal is applied to this detection circuit changing it from a high resistance state to a low resistance state. When the detection circuit is in a high resistance state a major portion of the storage voltage, from the differentiated pulse, appears across the detection circuit rather than the condenser and the portion appearing across the condenser is insufficient to reverse the polarization of the ferroelectric material to store a digit "1." However when the detection circuit is in its low impedance state, substantially all the storage voltage appears across the ferroelectric condenser and a "1" is stored.

Therefore the entire storage voltage is applied to the row leads and substantially no voltage to the column leads, storage control being attained due to the change in the high series impedance connected to the column leads. There is therefore only a very small disturbing voltage applied to the condensers associated with a column lead common to a condenser in which information is being stored. Even though information is stored very many times in condensers having a column electrode in common with a given condenser in which information is not to be stored, there is no possibility of information being falsely stored in that condenser due to repetitive disturbing voltages.

Disturbing voltages are applied to the condensers having a row electrode in common with a condenser in which information is being stored. However, before a storage pulse is applied to any condensers having a row electrode in common, a read out pulse is first applied. Therefore, there can never be more than one disturbing voltage applied to a condenser through a row electrode before a read out pulse is applied to that condenser to restore the proper polarization of any domains of the ferroelectric material that might have been reversed by a storage pulse.

Advantageously a diode is connected to each column lead poled so as to present a negligible impedance to a read out pulse applied to the condensers of the storage matrix but a high impedance to a storage pulse, so that substantially the entire voltage of the read out pulse from the differentiation circuit appears across the condensers.

The detection circuit may be of several types in accordance with different specific embodiments of this invention. Thus it may comprise a diode poled so as to present a low impedance to the negative storage pulse but having a negative bias connected thereto so as to present a high impedance to the storage pulse in the absence of an information signal. A circuit element, such as a single shot multivibrator, is then connected to the diode to generate a positive pulse to overcome this bias on application of an information signal to the element. Whenever the information signal message is such that a "1" is to be stored, the multivibrator circuit is tripped, the negative bias overcome, and a low impedance placed in series with the ferroelectric condenser.

The detection circuit may also comprise a monostable transistor multivibrator circuit. The output column leads are connected to the emitter leads of the transistor so that the ferroelectric condensers are connected to either a high resistance in the "off" state of the transistor or a low resistance in the "on" state. When it is desired to store information the transistors would be controlled by information pulses applied to the base of the transistors. Output pulses could advantageously be taken from the collector leads of the transistors.

If desired the output pulses from the ferroelectric condensers could be applied from the column leads to the input of the multivibrator circuits, which would then function as pulse regeneration circuits to restore the information just read from the condensers, as disclosed in the above mentioned application Serial No. 361,941. In such a case, the positive pulse read out of the ferroelectric condenser when a "1" has been stored would be large enough to trigger the detection circuit into its low resistance state for a period about twice the length of the read out pulse applied to the differentiation circuit. When the detection circuit is in its low resistance state, the negative portion of the differentiated read out pulse is sufficient to reverse the polarization of the crystal, restoring the "1" just read out. When the positive portion of the read out pulse is applied to a condenser in which a "0" is stored, only a very small positive pulse will appear on the associated column output lead which is insufficient to trigger the detection circuit. When the negative portion of the read out pulse is applied to the row leads, the polarization will not be reversed in the condenser due to the high series output resistance of the untriggered detection circuit, and the "0" will remain stored in the cell.

If information regeneration or restoring is employed, the read out pulse from the condenser is advantageously taken from the output of the detection circuit, which can act as a pulse amplifier and shaper, as disclosed in the above mentioned application Serial No. 361,941.

It is therefore a feature of this invention that storage of information be attained by applying to one side of a ferroelectric data storage condenser a voltage of sufficient magnitude to reverse the polarization of the ferroelectric material and thus to store information in the condenser by connecting a variable impedance to the other side of the condenser, the impedance being high when no information is to be stored and low when information is to be stored.

It is another feature of this invention that a differentiation circuit be applied to one electrode of a ferroelectric storage condenser and a detection circuit to the other electrode, a single pulse being applied to the differentiation circuit such that the differentiated pulse applied to the one electrode comprises a first portion of a voltage in excess of that required to read out information stored in the condenser and a second portion of opposite polarity to the first portion of a voltage sufficient to store information in the condenser, a pulse being applied to the detection circuit to change it from a high impedance state to a low impedance state when information is to be stored.

It is a feature of one specific embodiment of this invention that the detection circuit includes a diode poled so as to present a low impedance to storage pulses but having a bias applied to it so as in fact to present a high impedance to such pulses and a circuit element for overcoming that bias in response to information signals.

It is a feature of another specific embodiment of this invention that the detection circuit includes a transistor having its emitter connected to the electrode of the ferroelectric condenser other than that electrode to which the storage pulse is applied, the information signals being applied to the base of the transistor.

A complete understanding of this invention and of these and various other features thereof may be gained from consideration of the following detailed description and the accompanying drawing in which.

Figure 1:
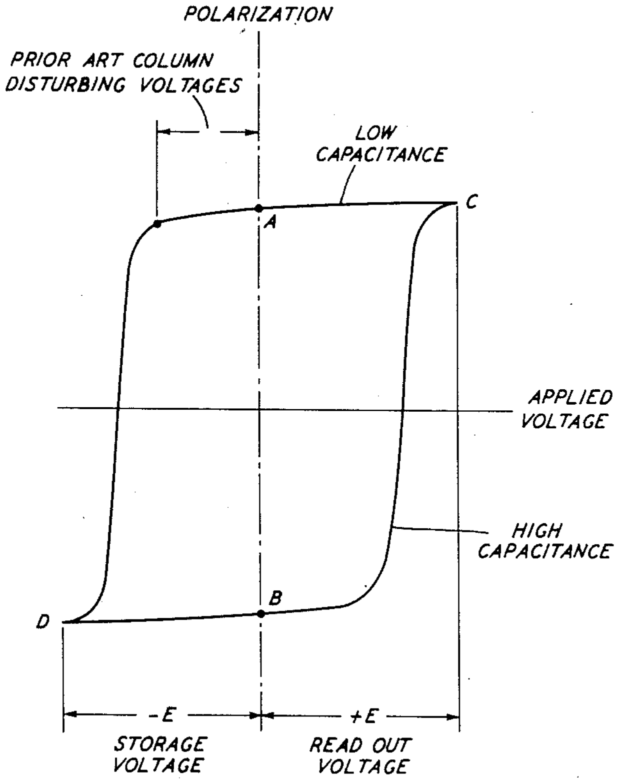
Fig. 1 is a typical hysteresis loop of barium titanate, a ferroelectric material.

Turning now to the drawing, Fig. 1 depicts the operating hysteresis loop of a single crystal of barium titanate, which may advantageously comprise the ferroelectric dielectric of a memory or storage condenser. As disclosed in the above mentioned application Serial No. 254,245 the hysteresis loop advantageously approached a rectangle in shape, having a high ratio between the slopes of the side portions of the loop and the slopes of the top and bottom portions of the loop. As is known, information is stored by applying a storage voltage $-E$ to the condenser so that the ferroelectric material traverses the path ADB. Information is then read out by applying a read out voltage $+E$ so that the material traverses the path BCA. If a "1" has been stored, so that the material is at the point B, the read out pulse causes the material to traverse a portion where the capacitance of the condenser will be high. If a "0" had been stored, which is equivalent to the storage of no information, the material would have remained at the point A so that application of the read out pulse will cause the material to traverse the path ACA, where the capacitance of the condenser will be low. In this manner a large read out pulse is obtained when a "1" has been stored and a very small read out pulse when a "0" has been stored.

In prior ferroelectric data storage systems wherein a number of condensers have been connected in a storage matrix with common electrodes, the storage voltage has been attained by applying a partial storage voltage, such as $-\frac{1}{2}E$, to one row of electrodes and a partial storage voltage, such as $+\frac{1}{2}E$, to one column of electrodes, the full storage voltage thus being only applied across that condenser between those particular row and column electrodes. Each other condenser associated with that row electrode will have this disturbing voltage, shown in Fig. 1, applied to it. While, as can be seen in the drawing, this disturbing voltage is by itself insufficient to reverse the polarization of the ferroelectric material, it may be sufficient to cause some of the domains of the material to reverse their polarization. And repeated applications of the disturbing voltage without an intervening read out voltage being applied to that condenser may cause a sufficient number of the domains of the ferroelectric material of that condenser to reverse, in fact to reverse the polarization of the material and thus erroneously to store a "1" in the condenser.

Figure 2:
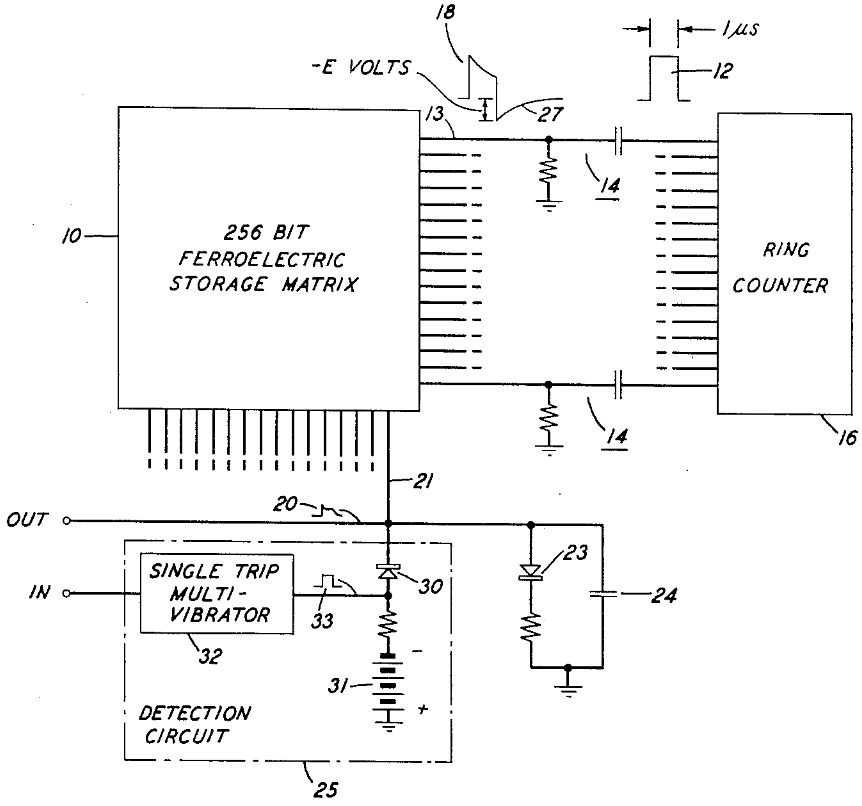
Fig. 2 is a schematic representation of one specific illustrative embodiment of this invention.

Turning now to Fig. 2 there is depicted one specific illustrative embodiment of this invention wherein a ferroelectric data storage system is employed in a time division switching system for the storage of sixteen sixteen-bit words. For purposes of illustrating the invention, let it be assumed that each of the sixteen-bit words must be read out of the memory 8,000 times a second and that the sixteen-bits will be available on sixteen parallel outputs which are common for all words in the storage. Thus, the maximum output pulse rate will be 128,000 bits per second on any output lead.

Figure 4:
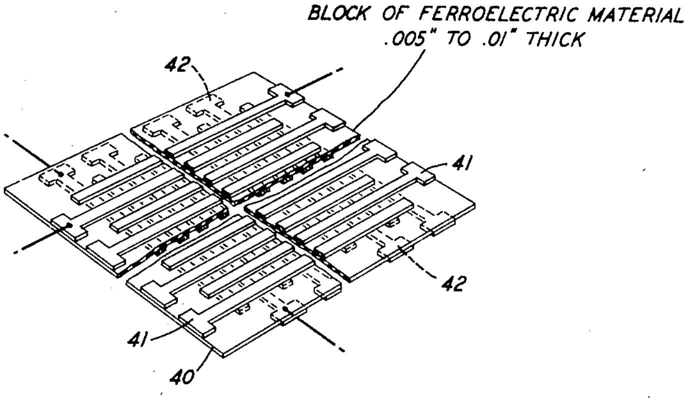
Fig. 4 is a plan view of a ferroelectric storage matrix that may be employed in the specific embodiments of this invention of Fig. 2.

The ferroelectric storage matrix 10 may advantageously comprise a 5/16 inch square barium titanate crystal 40 having sixteen horizontal .004 inch wide electrodes 41 on one face and sixteen vertical .004 inch wide electrodes 42 on the other face giving two hundred and fifty-six cross points or storage condensers, as seen in Fig. 4.

The read out process is attained by applying a one microsecond pulse 12 to each of the row electrode leads 13 through a differentiation circuit 14. The pulses 12 may advantageously be applied by a ring counting circuit 16 driven at the rate of 128,000 pulses per second by a time clock. The ring counter 16 may be a vacuum tube type, a transistor circuit, or a magnetic core delay line, as is known in the art. The positive portion 18 of the differentiated pulse is of a voltage magnitude in excess of +E volts and will reverse the polarization of those condensers in which a "1" has been stored, causing a positive output pulse 20 to appear on their respective column output leads 21. When the positive portion 18 of the differentiated pulse is applied to a condenser in which a "0" is stored only a very small positive pulse will appear on the associated output column lead 21.

Advantageously connected to each of the column output leads 21 is a diode 23, a capacitor 24, and a detection circuit 25. The diode is poled so as to present a low impedance to the positive portion 18 of the differentiated pulse, thus assuring that the major part of the voltage of the pulse portion 18 appears across the ferroelectric storage condenser. The capacitor 24 serves to aid in distinguishing read out pulses for "1" and "0," as described in the above-mentioned application Serial No. 254,245. Some of the capacitance designated by capacitor 24 will actually comprise the shunt capacitances of the unselected condensers connected to the columns.

The detection circuit 25 is utilized in the information storage cycle in accordance with this invention to enable information to be stored in a particular condenser in a ferroelectric storage matrix with substantially no disturbing voltage applied to the other condensers having the common column electrode. Information is stored by the negative portion 27 of the differentiated pulse. At the end of one microsecond the pulse 12 from the ring counter 16 ceases. At that instant the capacitor 28 of the differentiation circuit 14 will have charged up to some value. On cessation of the pulse 12 the voltage appearing on the row electrode 13 will be equal to the voltage to which the capacitor had charged minus the voltage of the pulse 12. Advantageously the time constant of the differentiation circuit is chosen so that this voltage of the negative portion 27 of the differentiated pulse is initially —E volts, sufficient, if applied across a ferroelectric condenser, to store a "1" in that condenser.

When it is desired to store a "1" an information message or pulse is applied to the storage system. This message is applied to a detection circuit 25. Each detection circuit defines a variable impedance connected to an output column lead 21 so as to be in series with the ferroelectric condensers associated with that column electrode. Normally the detection circuit 25 applies a high impedance to the negative portion 27 of the differentiated pulse. Thus when no information signal has been applied to the detection circuit 25 the voltage of the negative portion 27 will appear mainly across the detection circuit 25 and only a small portion across the condenser, considering the ferroelectric condenser to which the negative portion 27 is applied and the detection circuit as a form of voltage divider. Under these circumstances the voltage appearing across the condenser will be insufficient to reverse the polarization of the ferroelectric material comprising the dielectric of that condenser and therefore a "1" will not be stored.

When, however, an information message has been applied to the detection circuit 25, the detection circuit will present a negligibly low impedance to the negative portion 27 of the differentiated pulse. Under these circumstances substantially the entire voltage of the negative portion 27 will appear across the condenser and a "1" will be stored.

It is therefore apparent that very little disturbing voltage is applied over the column electrode 21 to other condensers having that electrode in common as a particular condenser in the matrix is chosen for storage by changing an impedance associated through the column lead with that condenser rather than by applying a voltage to it over that column lead. Hence repeated storage and reading out of information in a condenser in the column can not cause mistorage of information in other condensers common to that column.

A disturbing voltage is applied to each of the condensers common to the row electrode to which the differentiated pulse is applied. However, as a read out portion 18 must be applied to the row electrode before a second storage pulse portion 27 there cannot be a succession of disturbing voltages sufficient to store erroneous information. Any domains of the ferroelectric material whose polarization would be reversed by this disturbing voltage would have their polarization corrected by the read out portion 18 appearing before the next storage pulse portion 27.

One specific illustrative embodiment of a detection circuit is depicted in Fig. 2 and comprises a diode or rectifier 30 poled so as to present a negligible impedance to the negative portion 27 of the differentiated pulse. However, a negative bias is applied to the diode 30 as from a battery 31 so that normally the diode 30 presents a very high impedance to the negative portion 27. The information message advising the storage system to store a "1" is applied to a single trip multivibrator circuit 32 causing it to generate a positive pulse 33 just sufficient to overcome the negative bias of the battery 31 and restore the diode 30 to a negligible impedance. Representative voltage values, which are to be considered as merely illustrative are

| | Volts |
|---|---|
| Positive portion **18** (peak) | 60 |
| Negative portion **27** (peak) | —30 |
| Bias of battery **31** | —6 |
| Pulse **33** | 8 |

Figure 3:
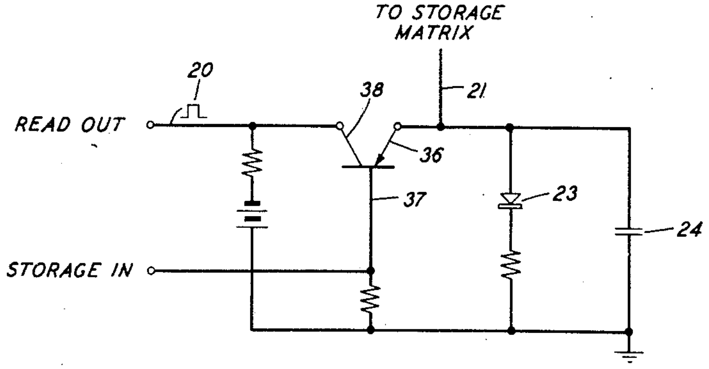
Fig. 3 is a schematic representation of a detection circuit illustrative of another specific embodiment of this invention.

Turning now to Fig. 3 there is depicted another embodiment of a detection circuit in which the change in impedance value of a transistor is utilized to provide the variable impedance for the selective storage of information. The output column lead 21 is connected to the emitter circuit 36 or a transistor multivibrator so that the column lead 21 sees a high resistance when the transistor is in its "off" state but a low resistance in the "on" state. During the storage interval the transistor circuit is controlled by an information message pulse applied to the base 37 of the transistor. The collector circuit 38 of the transistor provides a convenient point for taking off output pulses 20 from the storage system.

As the positive read out portion 18 of the differentiated pulse is in excess of that required to reverse the polarization of the ferroelectric material, the time interval for reading out the information in the ferroelectric condensers is shorter than that otherwise required with a differentiation circuit. Further, I have found that information can be stored even though the negative portion 27 of the differentiated pulse is not of sufficient power, due to its rapid decay, to reverse all the domains of the ferroelectric material and in such a case the possibility of an adverse effect from the disturbing voltage applied to the row electrode of other condensers of that row is even further reduced.

It is to be understood that the above described arrangements are illustrative of the application of the principles of the invention. Numerous other arrangements may be devised by those skilled in the art without departing from the spirit and scope of the invention.

What is claimed is:

1. In a ferroelectric data storage circuit, a ferroelectric condenser, means applying a pulse to one electrode of said condenser of sufficient magnitude to reverse the polarization of the ferroelectric material, means having a normally high impedance to said pulse connected to the other electrode of said condenser, and means for changing said normally high impedance to a low impedance in response to an information signal to store information in said condenser.

2. In a ferroelectric data storage circuit in accordance with claim 1, said normally high impedance means comprising a diode element poled so as to present a low impedance to said pulse and means applying a bias to said diode element so that said diode element presents a high impedance to said pulse and said means for changing said normally high impedance including means for overcoming said bias.

3. In a ferroelectric data storage circuit in accordance with claim 1, said normally high impedance means including a transistor having its emitter connected to said other electrode and said means for changing said normally high impedance including means for applying said information signal to the base of said transistor.

4. In a ferroelectric data storage circuit, a plurality of condensers each having a dielectric of a ferroelectric material, first means electrically connecting one electrode of each of said condensers in rows in one direction, second means electrically connecting the other electrode of said condensers in columns in another direction, means applying a pulse to one of said first means of sufficient magnitude to reverse the polarization of the ferroelectric material of each condenser associated with the row of said one first means, means having a normally high impedance to said pulse connected to each of said second means, and means for changing said normally high impedance to a low impedance connected to particular ones of said second means in response to an information message to store information in certain of said condensers.

5. In a ferroelectric data storage circuit in accordance with claim 4, said normally high impedance means comprising a diode element poled so as to present a low impedance to said pulse and means applying a bias to said diode elements so that said diode elements present a high impedance to said pulse and said means for changing said normally high impedances including means for overcoming said bias.

6. In a ferroelectric data storage circuit in accordance with claim 4, said normally high impedance means including transistors having their emitters connected to said second means and said means for changing said normally high impedance including means for applying said information message to the bases of said transistors.

7. In a ferroelectric data storage circuit, a ferroelectric condenser, a differentiation circuit connected to one electrode of said condenser, means applying a first pulse to said differentiation circuit of a voltage in excess of that required to read out information in said condenser, the output from said differentiation circuit on cessation of said first pulse being a second pulse of a polarity and a voltage sufficient to store information in said condenser, a detection circuit connected to the other electrode of said condenser and normally presenting a high impedance to said second pulse applied to said condenser, and means for changing said high impedance of said detection circuit to a low impedance to said second pulses to store information in said condenser.

8. In a ferroelectric data storage circuit, a condenser having a dielectric of a ferroelectric material, differentiation circuit means connected to one electrode of said condenser, means applying a pulse to said circuit means of a polarity and more than sufficient voltage magnitude to read out information stored in said condenser, said differentiation circuit means applying a voltage of opposite polarity to said one electrode on cessation of said pulse for the storage of information in said condenser, means having a normally high impedance to said voltage of opposite polarity connected to the other electrode of said condenser, and means for changing said normally high impedance to a low impedance in response to an information signal to store information in said condenser.

9. In a ferroelectric data storage circuit in accordance with claim 8, said normally high impedance means comprising a diode element poled so as to present a low impedance to said voltage of opposite polarity and means applying a bias to said diode element so that said diode element presents a high impedance to said opposite polarity voltage and said means for changing said normally high impedance includes means for overcoming said bias.

10. In a ferroelectric data storage circuit in accordance with claim 8, said normally high impedance means including a transistor having its emitter connected to said other electrode and said means for changing said normally high impedance including means for applying said information signals to the base of said transistor.

11. In a ferroelectric data storage circuit, a plurality of ferroelectric condensers, first means connecting one electrode of said condensers in rows in one direction, second means connecting the other electrodes of said condenser in columns in another direction, differentiation circuit means connected to each of said first means, means applying a pulse to one of said differentiation circuit means of a voltage in excess of that required to read out information stored in said condenser, said differentiation circuit means applying a storage pulse of opposite polarity to said one electrodes of said condensers on cessation of said pulse, means having a normally high impedance to said storage pulses connected to each of said second means, and means for changing said normally high impedance to a low impedance connected to particular ones of said second means in response to an information message to store information in certain of said condensers.

12. In a ferroelectric data storage circuit in accordance with claim 11, said normally high impedance means including diode elements poled so as to present a low impedance to said storage pulses and means applying a bias to said elements so that said diode elements present a high impedance to said storage pulses and said means for changing said normally high impedances including means for overcoming said bias.

13. In a ferroelectric data storage circuit in accordance with claim 11, said normally high impedance means including transistors having their emitters connected to said second means and said means for changing said normally high impedance including means for applying said information message to the bases of said transistor.

No references cited.